April 23, 1940. W. L. MORRISON 2,197,810
WIND DEFLECTOR FOR AUTOMOBILES
Original Filed June 27, 1933    2 Sheets-Sheet 1
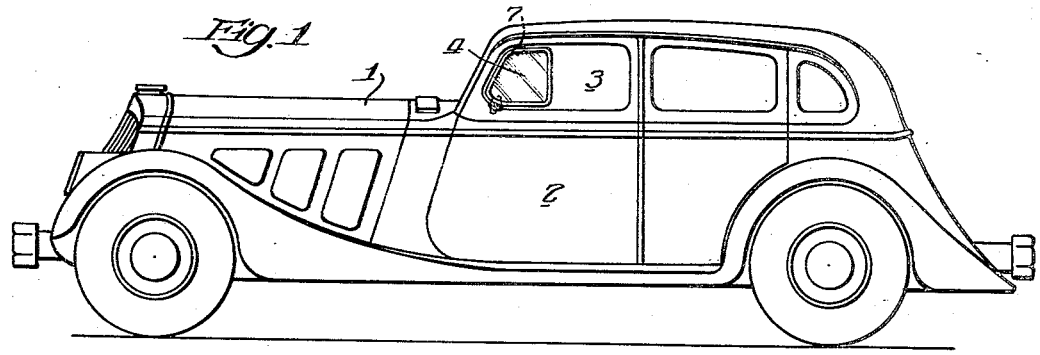
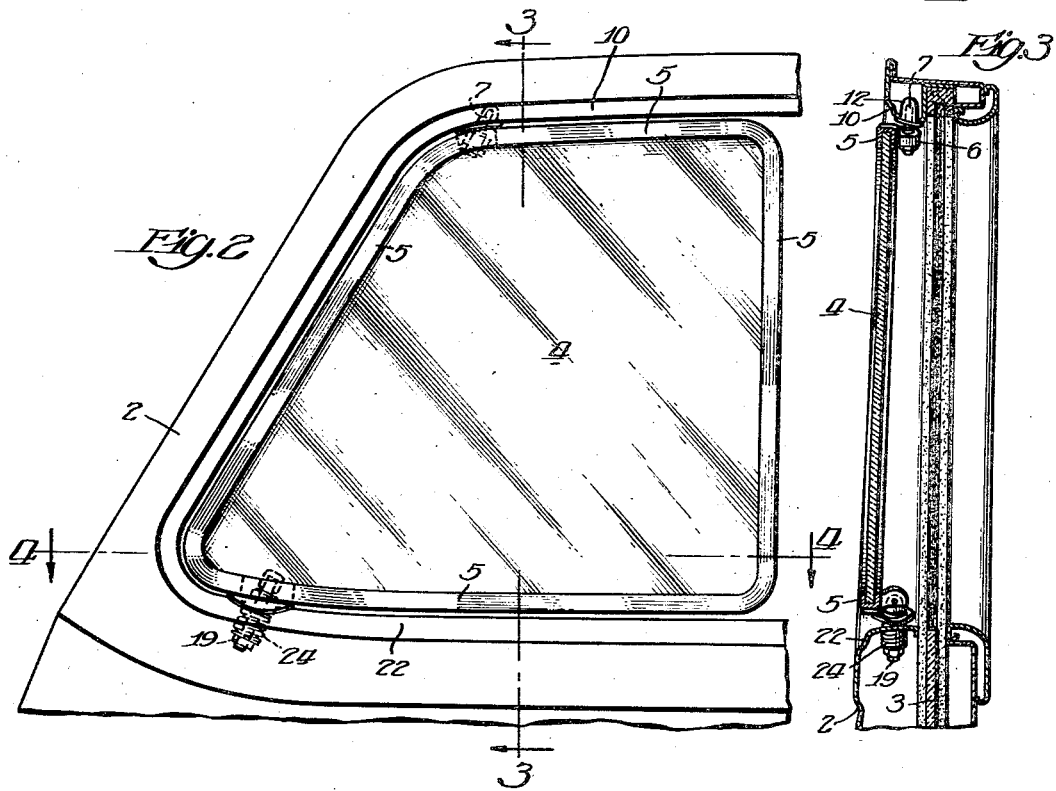
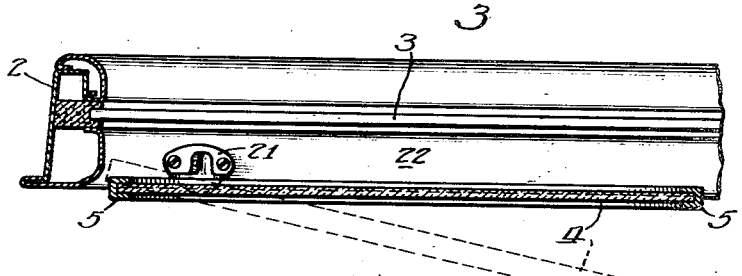
Inventor:
Willard L. Morrison
By Parker & Carter Attys.

April 23, 1940.   W. L. MORRISON   2,197,810
WIND DEFLECTOR FOR AUTOMOBILES
Original Filed June 27, 1933   2 Sheets-Sheet 2
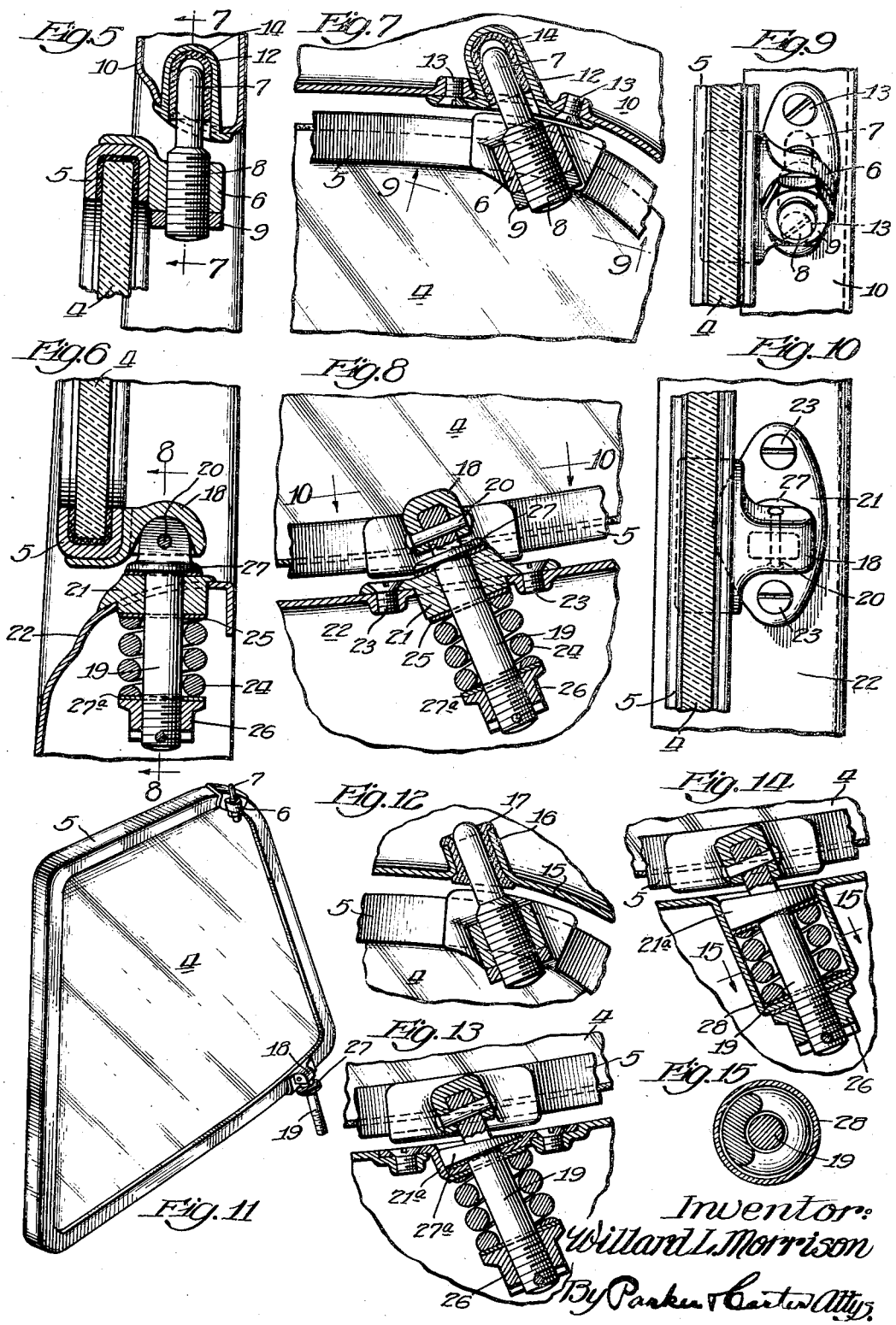

Patented Apr. 23, 1940

2,197,810

UNITED STATES PATENT OFFICE 2,197,810

WIND DEFLECTOR FOR AUTOMOBILES

Willard L. Morrison, Lake Forest, Ill.

Application June 27, 1933, Serial No. 677,890
Renewed July 25, 1939

7 Claims. (Cl. 296—84)

This invention relates to wind deflectors for automobiles and has for its object to provide a new and improved device of this description. The invention has as a further object to provide a device of this description adapted to be placed on the outside of the ordinary window and which has a concealed friction device for the pivot. The invention has as a further object to provide a device of this description wherein the glass section is pivoted at the top and the bottom, the pivots being at one side of the glass section, the glass section being free from strain. The invention has as a further object to provide a device of the kind described where the parts which connect the wind deflector with the reveal are held in place without the necessity of a spreading pressure. The invention has other objects which are more particularly pointed out in the accompanying description.

Referring now to the drawings, Fig. 1 is a view showing an automobile embodying the invention;

Fig. 2 is an enlarged view of the wind deflector in position;

Fig. 3 is a sectional view taken on line 3—3 of Fig. 2;

Fig. 4 is a sectional view taken on line 4—4 of Fig. 2;

Fig. 5 is an enlarged sectional view through the upper pivot supports;

Fig. 6 is an enlarged sectional view through the lower pivot supports;

Fig. 7 is a sectional view taken on line 7—7 of Fig. 5;

Fig. 8 is a sectional view taken on line 8—8 of Fig. 6;

Fig. 9 is a view taken on line 9—9 of Fig. 7;

Fig. 10 is a view taken on line 10—10 of Fig. 8;

Fig. 11 is a perspective view of the wind shield section separate from the window opening;

Fig. 12 is a view similar to Fig. 7 showing a modified construction;

Fig. 13 is a view similar to Fig. 8 showing a modified construction;

Fig. 14 is a view similar to Fig. 8 showing a further modification;

Fig. 15 is a sectional view taken on line 15—15 of Fig. 14.

Like numerals refer to like parts throughout the several figures.

Referring now to the drawings, I have shown in Fig. 1 an automobile 1 having a door 2 with the window opening having the glass 3 which may be moved down into a pocket in the door. On the outside of the glass is a glass wind shield section 4. The glass wind shield section has a frame member 5 at the top and bottom and this frame member may extend entirely around the glass if desired. Connected with the upper frame member 5 is a laterally projecting part 6 having a threaded opening therein. A pivot 7 having a threaded end 8 works in said opening and is adjustable, and is held in any adjusted position by the nut 9.

The upper reveal 10 of the window is provided with a pivot receiving recess in which the pivot 7 is received. This recess may be made in any desired manner. As illustrated in Figs. 5 and 7 this recess is formed by making a hole in the reveal and inserting therein a metal member 12 which is held in position by the fastening devices 13, see Fig. 7. Inside of the metal member 12 is a packing member 14 which may be of rubber or the like, and which receives the end of the pivot 7 and acts to prevent a metal to metal contact and to prevent rattling, and to maintain the pivot in proper position.

Instead of having the part 12 a separate part, I may simply indent the metal 15 of the reveal so as to form the thimble 16, as shown in Fig. 12. Within this thimble is the rubber piece 17 into which the end of the pivot 7 is received. This will cheapen the construction and yet serve the purpose. The frame piece 5 at the bottom of the glass section is provided with the laterally projecting part 18. The lower pivot 19 is connected with the part 18 by a pivot or pin 20 so as to give free movement to permit automatic adjustment of the parts. The pivot 19 passes through the holding member 21, which is fastened to the reveal 22 on the outside of the sliding window section 10, by the fastening devices 23, and projects into the reveal into a concealed position under the reveal and at one side of the chamber into which the window section 10 is lowered. This pivot 19 is provided with a friction device, which is also concealed within the reveal and by means of which friction is applied to resist the pivotal movement of the wind shield and hold this wind shield in any of its various positions.

As herein shown this is accomplished by means of a spring 24 which surrounds the pivot and which presses against the holding member 21, there being preferably a friction washer 25 between the end of the spring and the part 21. The pivot has a stop member 27 which engages the top of the holding member 21. At the end of the pivot is a threaded nut 26 having interposed between it and the end of the spring the friction washer 27a. It will be seen that by tightening up the nut 26 the spring is compressed and friction is applied on the friction washer 25 to resist the pivotal movement of the wind shield.

In Figure 13 I have shown a modified construction where the holding member 21a is a plate with a depression in it, and the pivot has fitting in this depression the stop member 27a, the top of it being substantially flush with the reveal. This construction does away with any part of the holding member projecting above the reveal.

In Figure 14 I have shown a further modification wherein the metal of the reveal is pressed or stamped inwardly to form a casing 28 for the spring and the stop 21a. The end of the pivot 19 passes through a hole in the bottom of the casing and the nut 26 engages the bottom of the casing, with suitable friction washers between the nut and the end of the spring. By unscrewing the upper pivot the wind shield may be removed, and by screwing it up it may be placed in position. In this device it is unnecessary to have any expanding pressure between the pivots, for the wind shield is held in place due to the fact that both the pivots project into the window frame or reveal and are held against any lateral movement by this construction.

It will be seen that by means of this construction I provide a wind shield with the friction element for the pivot concealed beneath the reveal so as to be out of the way, and that this concealment is provided when the device is used with the ordinary sliding window which slides down into a chamber in the door.

I claim:

1. A wind shield for automobiles comprising a glass section, a glass engaging member at the top, a pivot adjustably connected with said glass engaging member for pivotally connecting the wind shield with the reveal, a glass engaging member at the lower edge of the glass section, a pivot connected therewith, said pivot projecting through the reveal, and a concealed friction device for said pivot underneath said reveal for holding said glass in various angular positions, the effective friction surface being separate from said pivot.

2. A wind shield for automobiles comprising a glass section, a glass engaging member at the top, a pivot adjustably connected with said glass engaging member for pivotally connecting the wind shield with the reveal, a glass engaging member at the lower edge of the glass section, a pivot connected therewith, said pivot projecting through the reveal, and a concealed friction device for said pivot underneath said reveal for holding said glass in various angular positions, the effective friction surface being separate from said pivot, said pivot being pivotally connected with the glass section.

3. A wind shield for automobiles comprising a glass section, a glass engaging member at the top, a pivot adjustably connected with said glass engaging member, a recess in the upper reveal into which the end of the pivot is received, a glass engaging member at the lower edge of the glass section, a pivot connected therewith, said pivot projecting through the reveal, and a concealed friction device for said pivot underneath said reveal for holding said glass in various angular positions, the effective friction surface being separate from said pivot.

4. A wind shield for automobiles comprising a glass section, a pivot at the top of said glass section and connected therewith, a pivot at the bottom of said glass section projecting through the reveal, and a friction device for said pivot comprising a spring surrounding the pivot and a friction member through which the pivot passes and which is engaged by said spring, the spring and friction member being concealed beneath the reveal.

5. A wind shield for automobiles comprising a glass section, a pivot connected with the upper end thereof, and a pivot connected with the lower end thereof, said pivots projecting through the reveal of the window opening so as to be held by said reveal against displacement, a spring surrounding the lower pivot, a friction device associated with said spring, the friction device and spring being below the reveal.

6. A wind shield for automobiles comprising a glass section, a pivot connected with the upper end thereof, and a pivot connected with the lower end thereof, said pivots projecting through the reveal of the window opening so as to be held by said reveal against displacement, and a friction device associated with one of said pivots concealed in the reveal said friction device being below the portion of the reveal through which the pivot passes.

7. A wind shield for automobiles comprising a glass section, a pivot at the bottom of said glass section, arranged so that the glass section may be moved about an up and down axis, said bottom pivot being pivotally connected with said section with its axis at an acute angle with relation to the bottom edge of said glass section at the rear of said pivot, so that the section can move with relation to the bottom pivot on an axis at an acute angle to the axis of the bottom pivot, a second pivot connected with the top of said glass section, a socket in a fixed part of the window for said second pivot, said second pivot adapted to be inserted into and removed from said socket while the glass section is in an upright position.

WILLARD L. MORRISON.